June 6, 1933.  J. Q. GAUBERT  1,913,111
CONTROL DRIVE FOR VARIABLE CONDENSERS
Filed Feb. 15, 1932
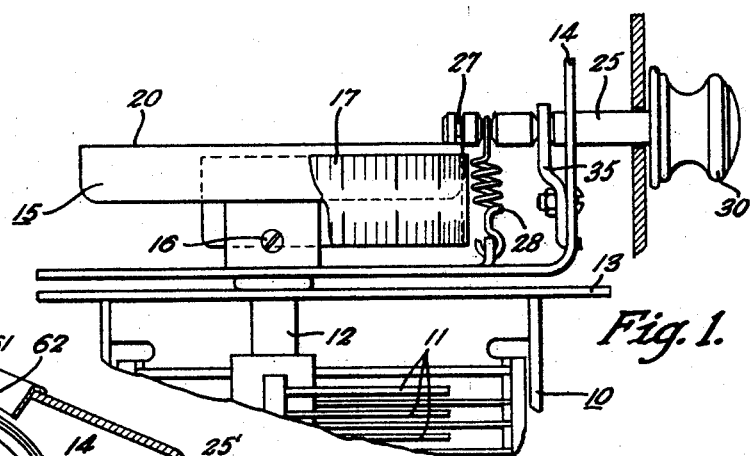
Fig. 1.
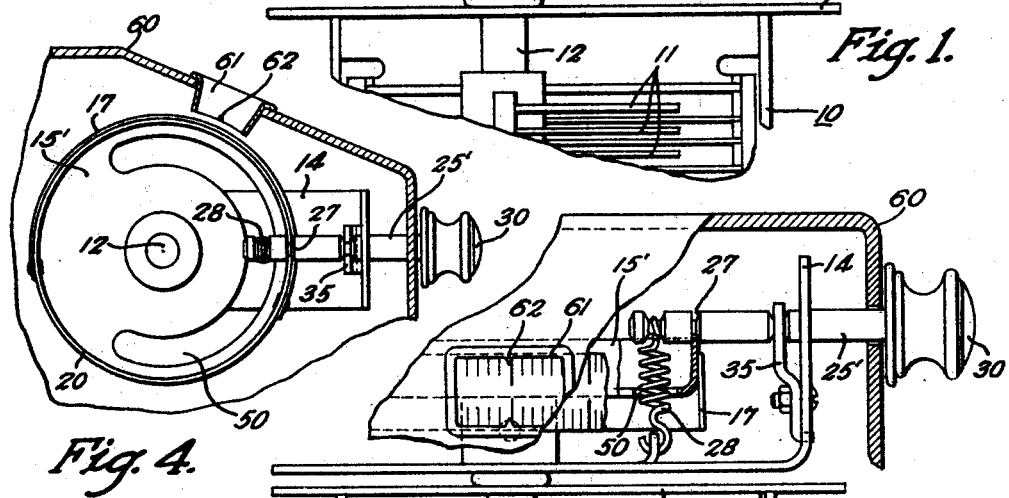
Fig. 4.
Fig. 5.
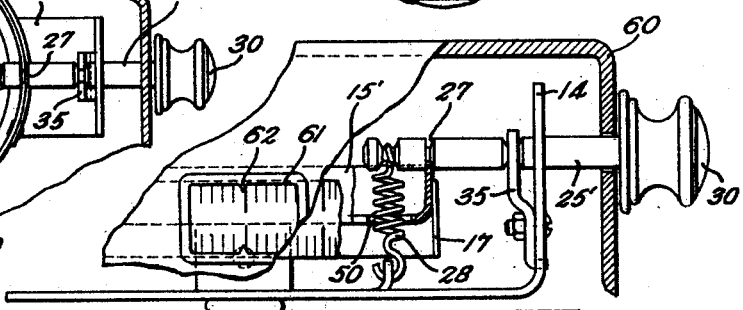
Fig. 2.
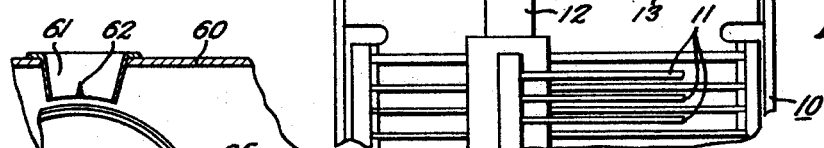
Fig. 3.
Inventor
JOHN Q. GAUBERT
by
Spencer Hardman & Fehr
his Attorneys Patented June 6, 1933

1,913,111

UNITED STATES PATENT OFFICE

JOHN Q. GAUBERT, OF DAYTON, OHIO, ASSIGNOR TO GENERAL MOTORS RADIO CORPORATION, OF DAYTON, OHIO, A CORPORATION OF OHIO

CONTROL DRIVE FOR VARIABLE CONDENSERS

Application filed February 15, 1932. Serial No. 593,179.

This invention relates to a control device for actuating the shaft of a variable condenser or the like, particularly such as are used in radio apparatus.

An object of the invention is to provide a simple and efficient manual drive for such a condenser or the like, wherein the manually turned shaft may be readily arranged at any desired angle in a plane substantially perpendicular to the driven shaft of the condenser.

Another object is to provide such a driving device having a manually actuated drive shaft which does not require being mounted in precisely aligned bearings and hence the cost of making and assembling is lessened.

Another feature of the device of this invention is the slight tilting movement permitted to the manual drive shaft, whereby said drive shaft cam can come and go a small amount to properly follow the possibly not precise movement of the driven member engaged by it. Thus no great accuracy is required in assembling the parts together and proper tracking of the engaging parts is maintained even though they become somewhat warped or misaligned in use. For example, the driving cup fixed to the condenser shaft may become worn or warped out of a true circle, yet the permitted movement of the condenser shaft will give proper tracking of the driving engagement without binding of any parts.

Further objects and advantages of the present invention will be apparent from the following description, reference being had to the accompanying drawing, wherein a preferred embodiment of one form of the present invention is clearly shown.

In the drawing:

Fig. 1 is a plan view of a condenser drive made according to this invention. Only a small portion of the variable condenser is shown and the indicator dial is shown partly broken away.

Fig. 2 is an end elevation of the drive device shown in Fig. 1, and also shows the housing in vertical section and stationary dial pointer.

Fig. 3 is a section on an enlarged scale, taken on line 3—3 of Fig. 2.

Figs. 4 and 5 show a slightly modified form, Fig. 4 is an end elevation similar to Fig. 2, and Fig. 5 is a view similar to Fig. 1, but shows a portion of the housing and the stationary dial pointer.

Similar reference characters refer to similar parts throughout the several views.

10 designates a variable condenser unit having the movable condenser plates 11 fixed to the rotating shaft 12 which is mounted on suitable bearings in the stationary condenser frame 13. Shaft 12 projects through the stationary bracket 14 and has a metal cup 15 fixed to its projecting end by means of the set screw 16. An indicating dial 17 is suitably fixed to the periphery of cup 15 by small rivets 18 but leaving the lip 20 of the metal cup 15 uncovered by dial 17 (See Figs. 1 and 3) for its proper engagement with the manual drive shaft 25 now to be described.

Drive shaft 25 extends somewhat loosely through hole 26 in support bracket 14 and has a peripheral groove 27 near its inner end which tracks upon the lip 20 of cup 15. A coil tension spring 28 is hooked through lug 29 in bracket 14 at its lower end and is hooked over shaft 25 at its upper end, so as to permit easy rotation of shaft 25 but at the same time to tilt it downwardly about its bearing in hole 26 as a pivot and cause pressure contact between the groove 27 thereon and lip 20 of cup 15. Thus suitable driving friction between shaft 25 and cup 15 is maintained so that when the hand knob 30 is turned the cup 15 is rotated together with the condenser shaft 12. A desirable high gear reduction between shafts 25 and 12 is obtained by the relatively small diameter of the contact circle of groove 27 and yet high friction engagement is obtained by the tapered shape of the groove 27 as clearly shown in Fig. 3. Shaft 25 is supported against lateral movement by the branch bracket 35 rigidly fixed to bracket 14 by the small bolt 36 and lug 37 which extends through a hole 38 in bracket 14. Bracket 35 has an open slot 40 at its upper end which fits snugly upon the sides of the reduced portion 41 of shaft 25 but does not oppose vertical motion of shaft 25. Thus the tilting motion of shaft 25 under the urge of spring 28 as above described is readily permitted and proper tracking of groove 27 upon the lip 20 is maintained even though the lip 20 be bent or worn out of a perfect circle after a period of use. Since shaft 25 does not require any precisely made or aligned bearings the parts to the device may be more cheaply made and assembled. Shaft 25 should fit only loosely in hole 26 as described above.

A feature of this drive mechanism is adjustability to locate the position of the hand knob 30 relative to the condenser frame 13. By simply changing the angular position of the stationary bracket 14 and its supported parts the knob 13 may be caused to project at any angle throughout a complete circle in a plane substantially perpendicular to shaft 12, since all the drive mechanism except cup 15 is supported on bracket 14. This adaptability to change of location of the manual control knob 30 is very advantageous when the same condenser mechanism is used in several different cabinets and where it is desired to locate the hand knob 30 differently in different cabinets.

The form of the invention shown in Figs. 4 and 5 is substantially the same as the form above described with the exception that the coil spring 28 engages shaft 25' on its inner end beyond the groove 27 thereon in order to obtain a greater pressure contact between the shaft 25' and the lip 20 of cup 15'. Since spring 28 remains stationary and cup 15' rotates, an arcuate slot 50 is provided in the bottom of cup 15' through which spring 28 extends and avoids interference with the rotation of cup 15', as will be obvious from the drawing. Figs. 4 and 5 show the exterior casing 60 of the cabinet having a small window 61 therein and a stationary dial pointer 62 on said window for proper observation of dial 17.

While the form of embodiment of the present invention as herein disclosed, constitutes a preferred form, it is to be understood that other forms might be adopted, all coming within the scope of the claims which follow.

What is claimed is as follows:

1. In combination, a variable condenser having a rotatable shaft, a driving cup fixed to said shaft and having an arcuate slot through the bottom of the cup, a dial band supported on said cup, a driving shaft extending substantially at right angles to said condenser shaft and having a peripheral groove thereon having frictional driving engagement with the periphery of said cup, and a stationary spring extending through said slot and having a sliding engagement with said driving shaft and urging said shaft against said cup periphery.

2. In combination, a variable condenser having a rotatable shaft, a driving cup fixed to said shaft and having a slot through the bottom of the cup, a dial band supported on the outer periphery of the cup and having indications thereon, a driving shaft extending substantially at right angles to said condenser shaft and having a peripheral groove thereon having frictional driving engagement with the periphery of said cup, and a stationary tension spring extending through said slot and engaging said driving shaft adjacent said peripheral groove and urging said shaft in pressure contact with said driving cup.

3. In combination, a variable condenser having a rotatable shaft whereby it may be changed in capacity, a driving cup fixed to said shaft and having an arcuate slot through the bottom of said cup, a driving shaft extending substantially perpendicular to said condenser shaft and having a peripheral groove thereon tracking upon the lip of said cup, and stationary yieldable means extending through said arcuate slot and engaging said driving shaft and urging it into pressure contact with said lip.

4. In combination, a variable condenser having a rotatable shaft whereby it may be changed in capacity, a driving cup fixed to said shaft and having an arcuate slot through the bottom of said cup, a driving shaft extending substantially perpendicular to said condenser shaft and having a peripheral groove thereon tracking upon the lip of said cup, and a coil spring extending through said arcuate slot and engaging said driving shaft and pulling it directly into pressure contact with said cup lip.

5. In combination, a variable condenser having a rotatable shaft whereby it may be changed in capacity, a driving cup fixed to said shaft and having an arcuate slot through the bottom of said cup, a driving shaft extending substantially perpendicular to said condenser shaft and having a bearing permitting a slight tilting movement to said driving shaft, said driving shaft having a friction portion thereon engaging said cup for driving the same, and spring means engaging said shaft and urging same tilted into pressure contact with said cup whereby to increase the friction betwen said cup and driving shaft.

In testimony whereof I hereto affix my signature.

JOHN Q. GAUBERT.